United States Patent
Goto

[15] 3,664,522
[45] May 23, 1972

[54] ARTICLE HANDLING APPARATUS

[72] Inventor: Yuro Goto, 250 Motoichiba, Fuji, Japan

[22] Filed: Sept. 2, 1970

[21] Appl. No.: 68,988

[30] Foreign Application Priority Data

Sept. 4, 1969 Japan..................................44/69862

[52] U.S. Cl.....................................214/8.5 SS, 214/8.5 F
[51] Int. Cl.......................................................B65g 59/02
[58] Field of Search................214/8.5 R, 8.5 A, 8.5 F, 8.5 SS

[56] References Cited

UNITED STATES PATENTS 3,176,859    4/1965    Prager................................214/8.5 SS

FOREIGN PATENTS OR APPLICATIONS 1,013,156    8/1957    Germany..........................214/8.5 SS Primary Examiner—Albert J. Makay
Assistant Examiner—George F. Abraham
Attorney—Linton & Linton

[57] ABSTRACT

An article handling apparatus is disclosed for feeding and transferring layers of sheet materials from one working station to another in a paper-making mill. The apparatus includes a pair of elongated rollers concentrically disposed and rotated by a chain and sprocket drive in a direction opposite to each other for gripping the article therebetween and moving the same forward toward a conveyor, means for limiting the position of feed of articles between the rollers and two pneumatic or hydraulic cylinders, one for imparting a vertical movement to one of said pair of rollers and the other for moving said means vertically into and out of the path of movement of the articles.

3 Claims, 5 Drawing Figures

PATENTED MAY 23 1972 3,664,522

INVENTOR
YURO GOTO
BY Linton and Linton
ATTORNEYS

ARTICLE HANDLING APPARATUS

This invention relates to an article handling apparatus for moving articles from one station to another, more particularly to an apparatus of the type which is designed for moving sheet articles at predetermined intervals from a feeding station to a packing station in a paper-making mill.

A variety of article handling devices of this description are known, but most of them have involved the use of reciprocating mechanisms such as reciprocating pushers or grippers for transferring piles of sheets of paper from one place to another. Because of the nature of reciprocation of the pushers or grippers, such prior-art devices have taken up a considerably large floor space to allow their back-and-forth movements and have had very slow cycles of operation as limited by the speed of their reciprocation from one working station to another.

Whereas, it is the primary object of this invention to provide a new, useful apparatus which will substantially eliminate the aforesaid difficulties of the prior-art devices and which will perform the transfer of sheet articles from one station to another with utmost efficiency. It is another object of the invention to provide an improved article handling machine which incorporates a rotative mechanism for gripping and transferring sheet articles to a predetermined desired position and which requires less floor space than reciprocating machines presently available.

These and other objects and features of the invention will become apparent from the following description taken in connection with the accompanying drawings illustrating a specific embodiment. In the drawings.

Figure 2:
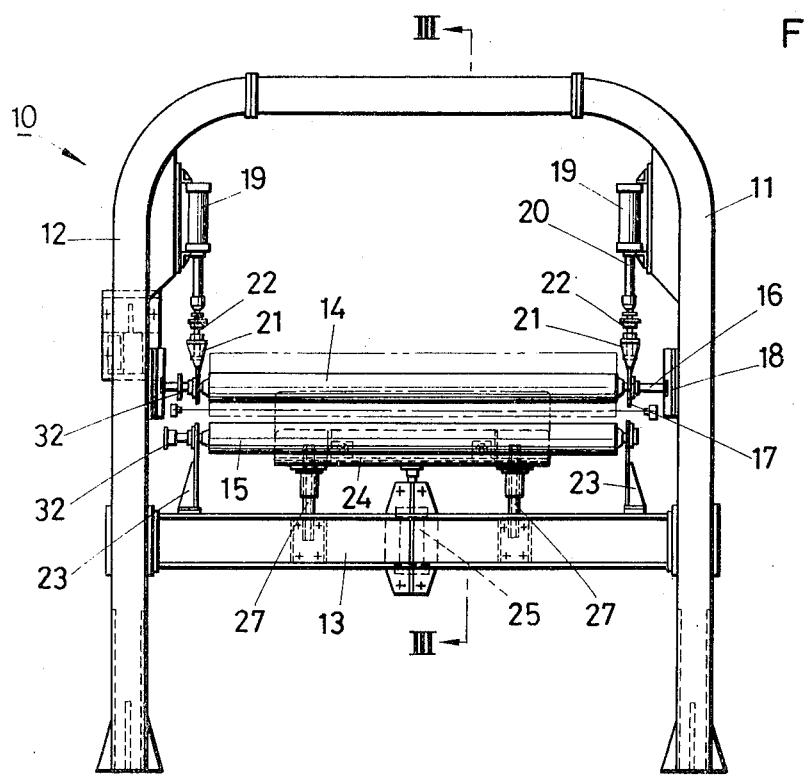
FIG. 2 is a front elevation of the apparatus.

Referring first to FIG. 2, there is shown an article handling machine 10 embodying the invention, which machine generally comprises a support structure including opposite spaced-apart vertical posts 11 and 12 with the respective upper elbows tying into each other and a transverse frame 13 extending between and secured to the opposite vertical posts. A pair of elongated gripping rollers 14 and 15 are rotatably journalled in suitable bearings between the frame posts 11 and 12 and are arranged to be driven by a motor M through a sprocket and chain drive mechanism later described. The upper gripping roller 14 is also vertically slidable along the posts, for which purpose the roller has a guide rod 16 at each end thereof extending from a flange 17 and disposed in a slot formed in a guide member 18 secured to each post. The roller 14 is vertically moved by a pair of cylinder 19, pneumatic or hydraulic, each with a piston rod 20 reciprocable therein and connected to the flange 17 of the upper roller 14 which is supported in a suspending bearing 21 connected to the rod 20. To adjust the distance of vertical movement of the roller 14, there is provided an adjustable nut-and-screw assembly 22 associated with the bearing 21 and connecting between the piston rod 20 and the flange 17.

The lower gripping roller 15 is rotatably mounted on a bracket member 23 secured to the transverse frame 13 and is disposed in concentric relation to the upper roller 14.

Figure 3:
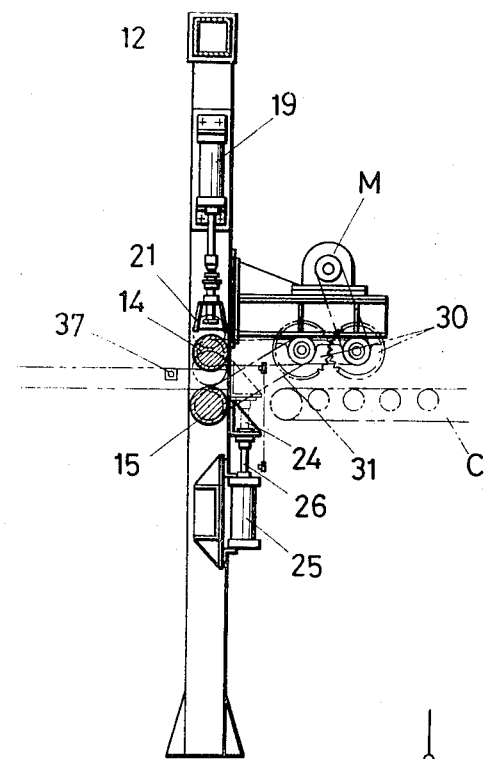
FIG. 3 is a cross-sectional view taken on line III—III of FIG. 2.
Figure 4:
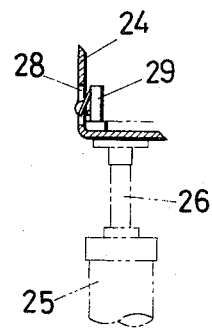
FIG. 4 is a sectional view of a movable position-limiter employed in accordance with the invention.

Designated at 24 is a longitudinally elongated L-shaped member vertically movable by and supported on a cylinder 25 as better seen in FIGS. 3 and 4. The L-shaped member 24 is adapted to limit the position of feed of sheet articles to the gripping and feeding rollers 14 and 15 as later explained. More specifically, the L-shaped position-limiter 24 is centrally supported on a reciprocating piston rod 26 of the cylinder 25 which may be pneumatically or hydraulically operated as the case may be, and is provided at its opposite ends with guide rods 27 each slidably disposed in the transverse frame 13. As shown in FIG. 4, the position-limiter 24 is further provided with recesses 28 adjacent to the position of the guide rods 27 for accommodating therein limit switches 29.

The upper and lower gripping and feeding rollers 14 and 15 are driven at a predetermined speed in a direction opposite to each other; that is to say, the upper roller is arranged to rotate in a counterclockwise direction and the lower roller in a clockwise direction so that they can grip a layer of sheet articles therebetween and forward it onto a suitable carriage such as a belt conveyor C (FIG. 3). The two rollers are driven by motor M through a transmission mechanism comprising meshing gears 30 connected to the motor shaft in the usual manner and drive chains 31 trained around said gears and sprockets 32 keyed to one ends of the respective shafts of the rollers 14 and 15.

The cylinders 19 and 25 have connected thereto solenoid valves 33 and 34, respectively, for controlling their operation.

Figure 5:
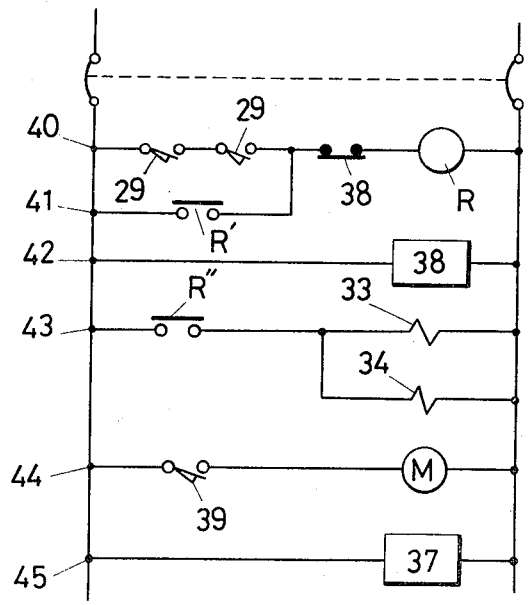
FIG. 5 is an electrical circuit diagram illustrating the various switches employed to control the operation of the apparatus.

Reference to FIG. 5 schematically shows a consolidated electrical control circuit incorporating the various control elements employed in accordance with the invention for controlling the operation of the machine which will now be described. A stack of a plurality of layers of paper sheets P is deposited on a pallet 35 placed on an elevator 36. This elevator may be of any conventional type capable of moving up and down at a predetermined speed and interval in response to a signal such as for example a signal emanating from the photoelectric device 37 which is provided at a position corresponding to the uppermost layer of paper sheets desired for transfer onto the conveyor C. The elevator 36 is arranged to move only during a period at which the phototubes 37 are exposed to light, this phototube circuit being normally closed as shown in the circuit diagram of FIG. 5.

Figure 1:
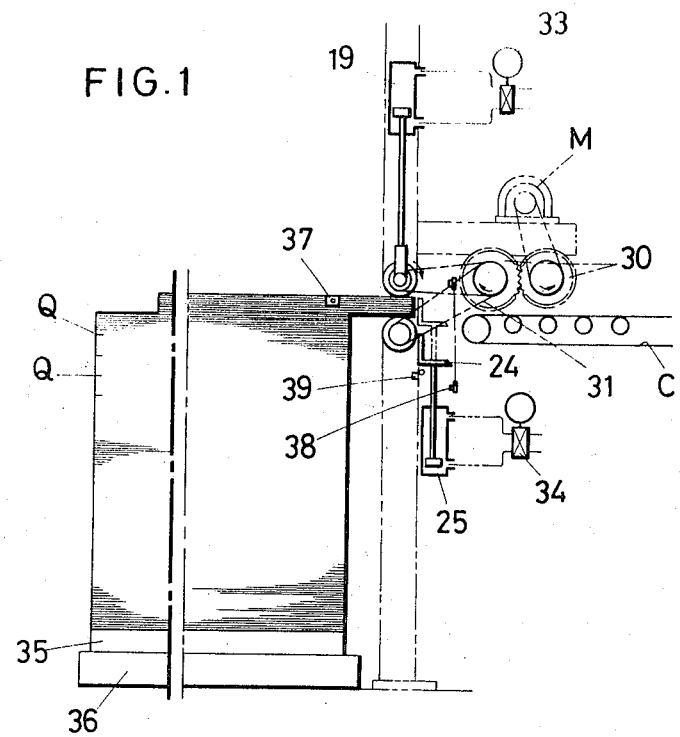
FIG. 1 is schematic side elevation of the operating parts of an apparatus embodying the invention and utilized to explain the manner in which a layer of sheets of paper is fed and transferred onto a belt conveyor.

Individual layers indicated as by marker tapes Q, each layer consisting for example of a hundred sheets of precut paper, are pressed forward by hands bundle by bundle in turn until the uppermost layer is held in abutting relation to the position-limiter 24 as shown in FIG. 1. As the forward end of the uppermost layer is thus brought into contact with the limiter 24, the limit switches 29 are placed in on-position so as to actuate the relay R included in circuit 40 shown in FIG. 5. The relay R is actuated because the photoelectric relay contact 38 in circuit 40 is normally closed, and hence the switch contact R' in circuit 41 is also closed, as is the contact R'' in circuit 43. This causes the solenoids 33 and 34 to be energized thereby actuating the cylinders 19 and 25 associated with the upper roller 14 and the limiter 24, respectively, whereupon the piston rods 20 and 26 are lowered as viewed in the drawing until the upper roller touches and grips the feed layer between it and the lower roller 15, and the limiter 24 hits a limit switch 39 positioned beneath the same. The closing of the limit switch 39 energizes the motor M in circuit 44 so that the upper and lower rollers are rotated by the sprocket and chain drive mechanism already described, in which instance the upper roller 14 rotates counterclockwise and the lower roller 15 clockwise so as to move the layer of sheet articles forward and toward the conveyor C until it is deposited on the latter for further transfer to for instance a packing station.

To bring the machine automatically back into its starting position to resume and repeat the loading operation, the photoelectric relay 38 is arranged to be actuated with the conduction of light therethrough which occurs immediately after the layer P has been completely deposited on the conveyor C, and to thereby hold its contact in off-position in circuit 40, so as to release the relay R and hence solenoids 33 and 34. In this position of the solenoids, the upper roller 14 is returned to its raised position indicated in chain-dotted lines in FIG. 2 and the limiter 24 ascends to a position indicated in chain-dotted lines particularly in FIG. 1 at which position the limiter awaits an abutting engagement with the next bundle of paper sheets P. The function of the photoelectric relay 37 in circuit 45 associated with the elevator 36 is well known in the art and will require no further explanation.

Having thus described the invention, it will be understood that modifications and changes may be made in the specific form and construction herein advanced, without departing from the scope of the appended claims.

What is claimed is:

1. An article handling apparatus comprising in combination a pair of spaced vertical supports, a motor, a sprocket and chain drive mechanism connected to said motor, means for gripping and feeding layers of sheet articles including a pair of elongated rollers disposed in opposed relationship and connected to said sprocket and chain drive for being rotated in a direction opposite to each other, a position-limiting means movable into and out of the path of movement of the articles for limiting the positioning of a layer of the articles between said rollers, a cylinder with a vertically movable rod connected to one of said pair of elongated rollers to move it along said vertical supports toward and away from the other roller and another cylinder with a vertically movable rod connected to said position-limiting means to impart vertical movement thereto.

2. The apparatus as claimed in claim 1 which further comprises means for electrically controlling the operation of the apparatus, said means including solenoid valves associated with said cylinders, a limit switch connected to said position-limiting means and disposed for abutting relation to the forward end of the layer of the sheet articles, said limit switch being arranged to energize said solenoids, and another limit switch engageable with said position-limiting means for energizing the motor.

3. The apparatus as claimed in claim 1 wherein said position-limiting means is a longitudinally elongated L-shaped member having a recess for accommodating said first limit switch.

* * * * *